United States Patent
Donnini (10) Patent No.: US 10,145,534 B2
(45) Date of Patent: Dec. 4, 2018

(54) LINEAR LIGHTING APPARATUS

(71) Applicant: TARGETTI SANKEY S.P.A., Florence (IT)

(72) Inventor: Andrea Donnini, Florence (IT)

(73) Assignee: TARGETTI SANKEY S.P.A., Firenze (IT)

( * ) Notice: Subject to any disclaimer, the term of this patent is extended or adjusted under 35 U.S.C. 154(b) by 0 days.

(21) Appl. No.: 15/565,455

(22) PCT Filed: Apr. 8, 2016

(86) PCT No.: PCT/IB2016/052013
§ 371 (c)(1),
(2) Date: Oct. 10, 2017

(87) PCT Pub. No.: WO2016/162849
PCT Pub. Date: Oct. 13, 2016

(65) Prior Publication Data
US 2018/0119921 A1    May 3, 2018

(30) Foreign Application Priority Data
Apr. 10, 2015   (IT) ............... BS2015A0059

(51) Int. Cl.
| F21V 17/00 | (2006.01) |
| F21V 5/04 | (2006.01) |
| F21V 7/00 | (2006.01) |
| F21V 13/04 | (2006.01) |
| F21V 13/14 | (2006.01) |
| F21S 4/20 | (2016.01) |
| G02B 19/00 | (2006.01) |
| G02B 3/06 | (2006.01) |
| F21Y 103/10 | (2016.01) |
| F21Y 115/10 | (2016.01) |

(52) U.S. Cl.
CPC ............ *F21V 5/043* (2013.01); *F21S 4/20* (2016.01); *F21V 5/04* (2013.01); *F21V 7/005* (2013.01); *F21V 13/04* (2013.01); *F21V 13/14* (2013.01); *G02B 3/06* (2013.01); *G02B 19/0014* (2013.01); *G02B 19/0066* (2013.01); *F21Y 2103/10* (2016.08); *F21Y 2115/10* (2016.08)

(58) Field of Classification Search
USPC ........................................................ 362/455
See application file for complete search history.

(56) References Cited

U.S. PATENT DOCUMENTS

2011/0051425 A1    3/2011    Tsuchiya et al.

FOREIGN PATENT DOCUMENTS

| DE | 10 2005 035720 A1 | 2/2007 |
| DE | 20 2009 008684 U1 | 2/2010 |
| EP | 2402648 A1 | 4/2012 |
| WO | 2010/026279 A1 | 3/2010 |
| WO | 2014/004923 A1 | 1/2014 |

*Primary Examiner* — Vip Patel
(74) *Attorney, Agent, or Firm* — Arent Fox LLP (57) ABSTRACT

A linear lighting apparatus, comprises a plurality of lighting sources aligned along a main axis of the apparatus a cylindrical lens with its axis parallel to the main axis of the apparatus, said cylindrical lens being suitable to receive most of the light emission generated by the lighting sources and to emit a substantially collimated light beam, and a reflector suitable to reflect at least a portion of the light emission not refracted by the cylindrical lens.

17 Claims, 6 Drawing Sheets

LINEAR LIGHTING APPARATUS

FIELD OF THE INVENTION

This invention relates to a linear lighting apparatus, i.e., of elongated shape, with a plurality of lighting sources, in particular of the LED type, arranged in line with a certain step of distance from each other.

BACKGROUND

These apparatuses find frequent application, often to replace fixtures with long fluorescent bulbs, in a continuous line or in separate bodies, in suspension, ceiling and recessed ceiling systems for interiors and built in to pavements and applied to walls for exteriors, in particular for illuminating façades, cornices, etc. In some embodiments, the linear boards accommodate and manage LEDs of different colours to implement RGB or CTC (Colour Temperature Change) lighting.

The LEDs mounted on these cards can be of various types but, to obtain high luminous power, high-power, mono- or multi-chip LEDs are normally used. The heat produced is concentrated in discrete points and requires the use of circuit boards printed on an aluminium substrate. The high cost of these boards is mainly due to the large aluminium surfaces of the printed circuit board.

For this reason, for some years boards have been proposed with "mid-power LEDs", i.e., sources of much lower power and cost but with high lighting efficiency compared to high power LEDs. At the same total light emission of the board, mounted in greater numbers, these LEDs produce less heat and distribute it better to the printed circuit, thus allowing the use of insulating substrates such as simple Vetronite instead of aluminium. The cost per lumen is lowered significantly.

In many applications mentioned above, a major problem is that of uniformity of emission near the apparatus. For example, in the oblique illumination of a wall, excessive distances between the LEDs are to be avoided because they produce unwanted bright strips or visibly separated beams. More densely populated mid-power boards are advantageous for this aspect as well.

However, the short-step mounting of the LEDs can create significant problems in the case of collimating optics, i.e., to produce narrow beams.

Even from a linear board, one often wants to obtain a narrow beam in all directions. In this case, parabolic reflectors or collimating lenses (TIR, spherical or aspherical) on each LED generate beams that are narrower the larger they are; the limit to the use of this type of optical element is given by both the section of the apparatus and the distance between the lighting sources. In this case, therefore, the more populated boards are generally the most disadvantaged.

In the case of the uniform oblique lighting mentioned above, the light distribution should be fundamentally blade of light, narrow only in the direction transverse to the apparatus, as wide and uniform as possible longitudinally to it. To implement such a photometry with a row of LEDs (which are almost always Lambertian sources), one can choose various types of optics.

SUMMARY

An embodiment provides for the use of single and lined filter optics: for each LED, a lens or a reflector closes the beam in all directions, then this is expanded in the longitudinal direction with a filter with grooves or with a machining of the lens itself with lines. In this case the optical dimensions are linked to the step of the LEDs; furthermore, there is the limit of about 60° on the longitudinal opening effect of the beam.

Another embodiment provides the use of collimating optics of the linear type, wherein there is a single optics for all LEDs simultaneously, with an effect independent on the distance between the LEDs. The longitudinal uniformity of the beam is here the best because it does not intervene on the rays in that direction. In practice, this technical solution can be achieved with a parabolic reflector having two long reflective elements profiled at the sides of the row of LEDs. This embodiment has the disadvantage that part of the luminous flow (in particular the direct light) remains ingested and "dirties" the beam.

As an alternative to the parabolic reflector, a lens with a suitable profile, such as a TIR lens, can be used. However, the realisation of a lens of this type is complex and expensive.

The purpose of this invention is to provide a linear lighting apparatus capable of obviating the drawbacks mentioned above with reference to known art, in particular having an optics independent of the distance between the lighting sources, therefore able to operate indifferently with boards of different light power, having a high collimating power, and that is still simple and inexpensive to produce and assemble.

This purpose is achieved with a lighting apparatus according to claim 1. The dependent claims describe particularly advantageous preferred embodiments.

In a general embodiment of the invention, the linear lighting apparatus includes a plurality of lighting sources, for example of the LED type, aligned along a main axis of the apparatus. A cylindrical lens with its axis parallel to the main axis of the apparatus is suitable to receive the majority of the light emission generated by the lighting sources and to emit a substantially collimated light beam. At least the light emission that does not undergo refraction by the cylindrical lens is reflected by a reflector.

In an embodiment, the lighting sources are placed in the focus of the cylindrical lens.

Preferably, the lighting sources are placed also in the focus of the reflector.

Substantially, all the light rays are managed by the optical elements and the beam generated is highly collimated.

In an embodiment, the reflector is a parabolic reflector. In particular, the parabolic reflector has a pair of longitudinal walls that extend parallel to the axis of the apparatus at the sides of the row of lighting sources.

In an embodiment, the cylindrical lens is positioned at least partially in the cavity delimited by the reflector.

In addition to generating a collimated light beam, the lighting apparatus is thus particularly compact.

Having defined the sources plane as a plane on which the lighting sources lie, for example, a plane defined by an electronic board on which the sources are mounted, in an embodiment, the axis of the apparatus and the axis of the cylindrical lens belong to a transversal plane perpendicular to said sources plane.

In an embodiment variant, the axis of the apparatus is external to a transversal plane on which the axis of the cylindrical lens lies and perpendicular to said sources plane. In this case, preferably the reflector is shaped so as to reflect the rays in the same direction as the collimated beam exiting from the cylindrical lens.

In a preferred embodiment, the lighting apparatus comprises a holographic filter suitable to act on the collimated light beam emitted by the cylindrical lens.

Advantageously, the holographic filter is supported by the reflector itself.

BRIEF DESCRIPTION OF THE DRAWINGS

Further details and advantages of the lighting apparatus according to this invention will be evident from the following description of a preferred embodiment, provided by way of non-limiting example, with reference to the accompanying drawings, in which.

DETAILED DESCRIPTION

In the course of the description that follows, the elements common to the various embodiments of the lighting apparatus according to the invention, or equivalent to each other, are indicated with the same numerical references.

Figure 1:
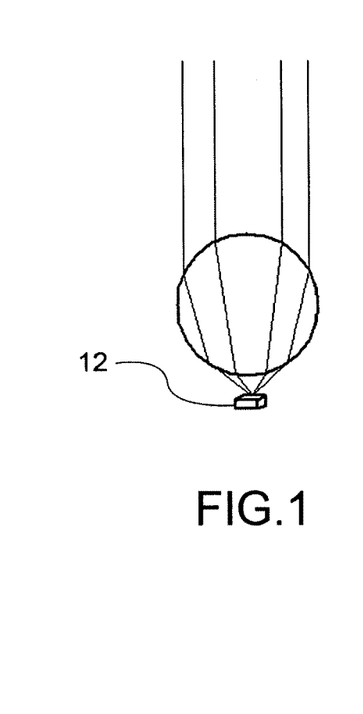
FIG. 1 schematically illustrates the use of a sphere as a collimating lens for a lighting source.

The idea underlying the invention originates from the principle of the full spherical lens (FIG. 1). The full transparent sphere corresponds optically to the coupling of two powerful opposing flat-convex lenses. If R is the radius of the sphere and n is its index of refraction, the ball lens has a focus length $f=R*n/2(n-1)$.

Figure 2:
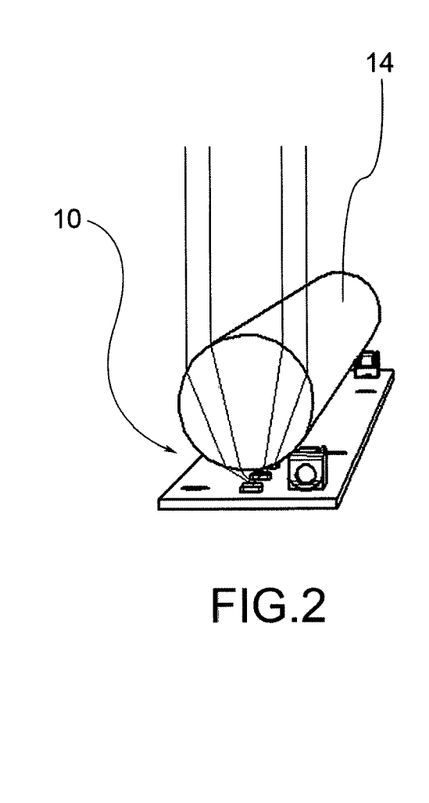
FIG. 2 schematically illustrates the use of a cylindrical rod as a collimating lens for a plurality of lighting sources arranged in a line.
Figure 3:
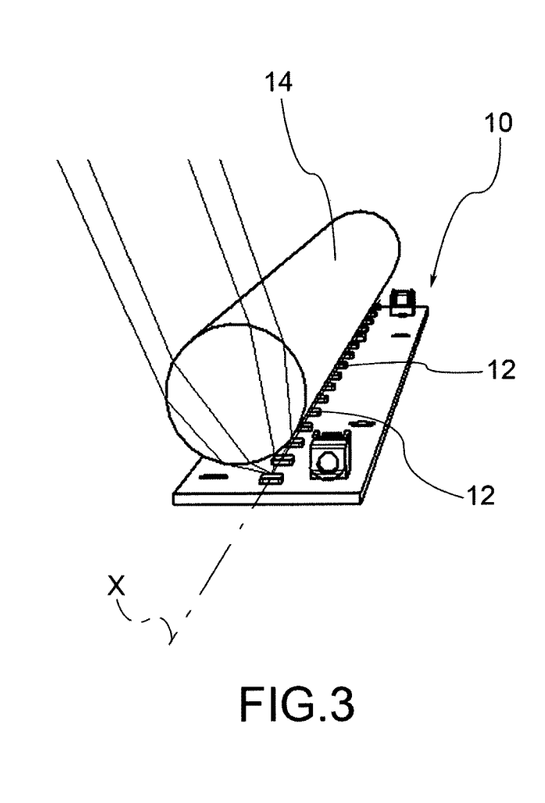
FIG. 3 illustrates an embodiment variant of the optical scheme of the previous figure, for orienting the collimated beam in a direction inclined with respect to the plane orthogonal to the plane of the lighting sources.

In order to adapt this principle to a linear apparatus 10, i.e., having a plurality of lighting sources 12 arranged side by side along a main development axis X of the apparatus, we passed from the ball lens to a cylindrical lens 14, or "rod" lens, with the main axis parallel to the axis of development of the apparatus. Ideally, the cylindrical lens is obtained by "extruding" the same circular section of the spherical lens (FIGS. 2 and 3). By placing the row of lighting sources 12 in parallel and at the correct focal distance from the cylindrical lens 14, a very narrow blade of light is obtained.

Advantageously, as cylindrical lens 14 you can use a simple rod made of methacrylate (PMMA). For example, the rod has a diameter of between 10 mm and 20 mm. Transparent methacrylate rods are very common and relatively inexpensive objects, produced and used in various sizes, for example in furnishing for ornamental purposes.

Since the distance between the lighting sources 12 and the cylindrical lens 14 is such that part of the light emission generated from the sources does not penetrate in the rod, but escapes laterally, to retrieve this scattered light and at the same time increase the efficiency of collimation, the lighting apparatus further comprises a reflector 16 suitable for reflecting the light rays not intercepted by the cylindrical lens 14. Preferably, these rays are reflected in the same direction as the collimated beam exiting from the cylindrical lens 14.

In a preferred embodiment, the reflector 16 is a parabolic reflector and the lighting sources 12 are placed in the focus of the parabolic reflector. In particular, the parabolic reflector has a pair of longitudinal walls 16' that extend parallel to the axis of the apparatus at the sides of the row of lighting sources 12.

For example, the reflector 16 is made of mirror-like, high-reflectance anodised aluminium.

In preferred embodiments, the cylindrical lens 14 is positioned at least partially in the longitudinal 18 cavity delimited by the reflector 16.

Since, in addition, the refraction of the lens 14 causes typical chromatic separation effects of the light, with the appearance of yellowish edges in the beam, to avoid or limit these effects, at the exit of the light emission from the apparatus, there is a calibrated-diffusion filter 20, also known as a holographic filter.

In some embodiments, wherein the cylindrical lens 14 is received in the longitudinal cavity 18 defined by the reflector 16, the holographic filter 20 is supported by the reflector itself. For example, the filter is fixed to the reflector edges.

Figure 4:
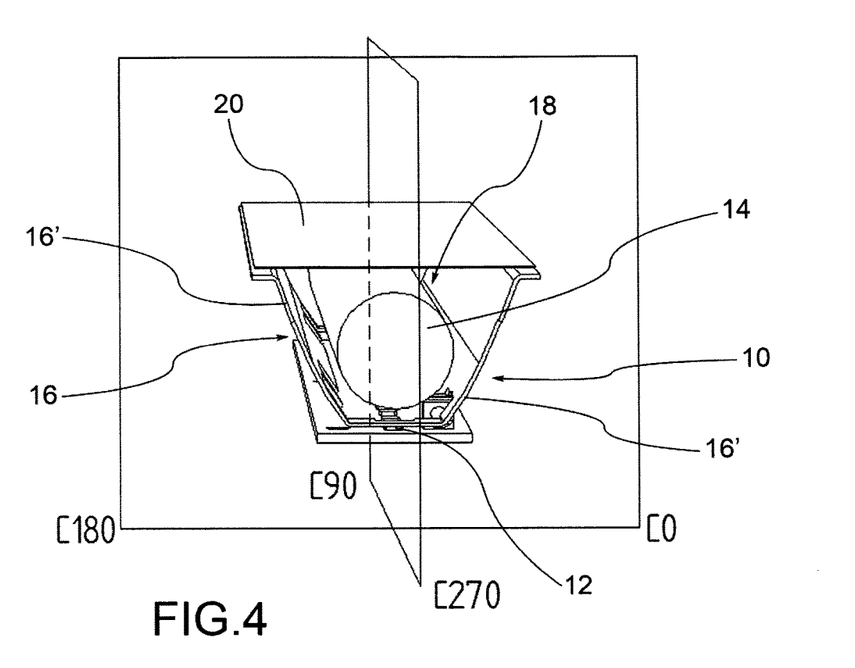
FIG. 4 is a perspective view of a lighting apparatus according to the invention, in a first embodiment.
Figure 4A:
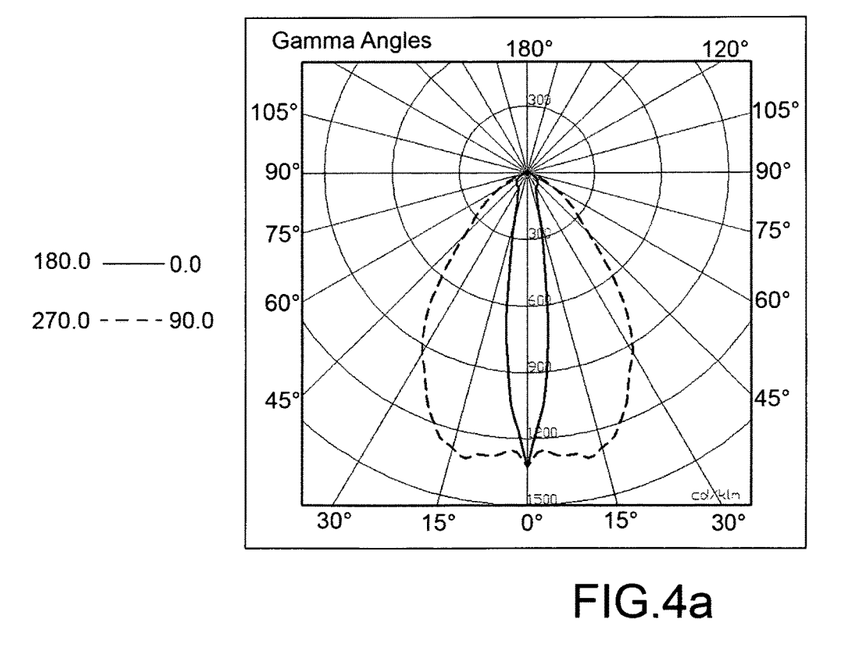
FIG. 4a is a diagram of the distribution of the light beam generated by the apparatus of FIG. 4.

In the embodiment illustrated in FIGS. 4 and 4a, the filter 20 has an aperture of 10°. In particular, FIG. 4a shows, using the C/γ reference coordinate system commonly used to describe light emissions, the transverse light distribution (continuous line), i.e., in the plane C0-C180 orthogonal to the main axis of the apparatus, and the longitudinal light distribution (in dashed line), or in the plane C90-C270 parallel to the main axis of the apparatus.

To obtain greater apertures of the beam in the transversal direction, it is possible to replace the filter with aperture of 10° with other filters with greater apertures. Due to the optimised characteristics of the holographic filters, the loss of optical yield is minimal.

Figure 4B:
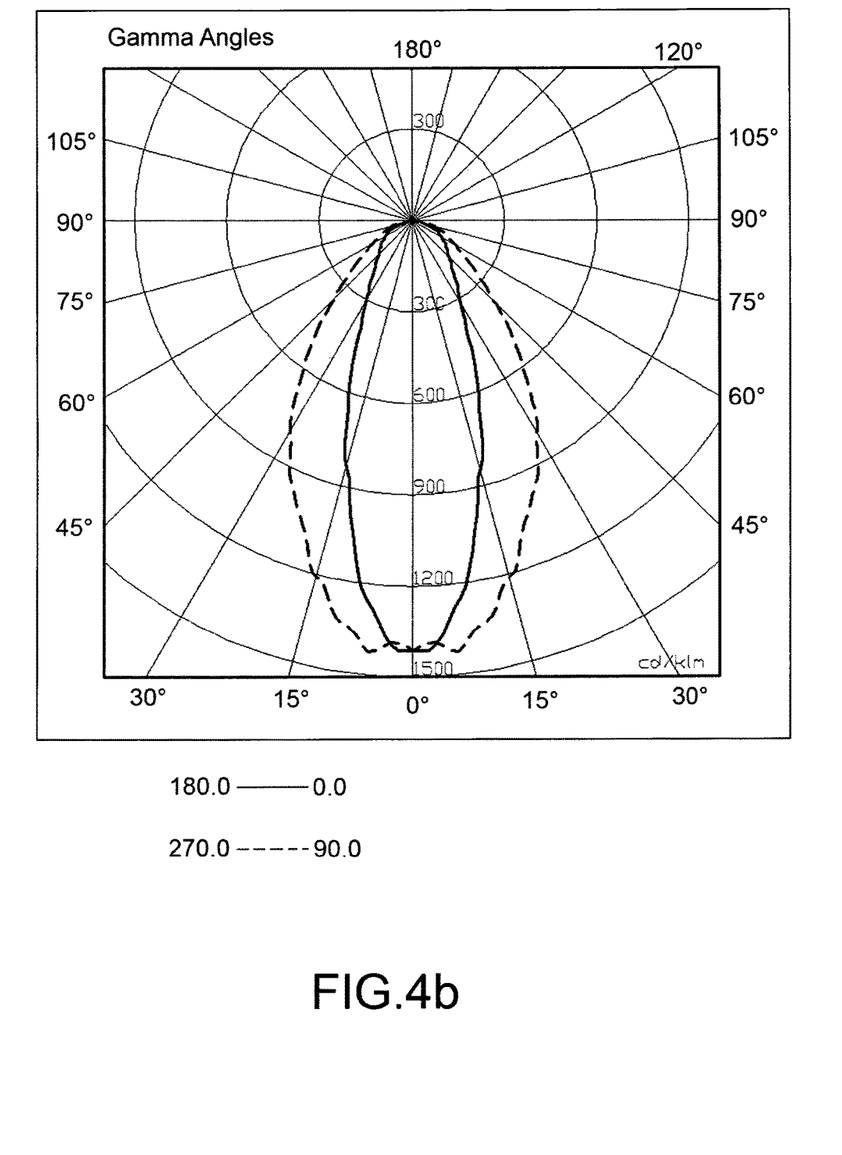
FIG. 4b is a diagram of the distribution of the light beam generated by the apparatus of FIG. 4, but with a different holographic filter.

For example, for the apparatus of FIG. 4 using a holographic filter 20 with aperture of 30°, one obtains a light beam of the blade-flood type, whose light distribution is shown in FIG. 4b.

Figure 5:
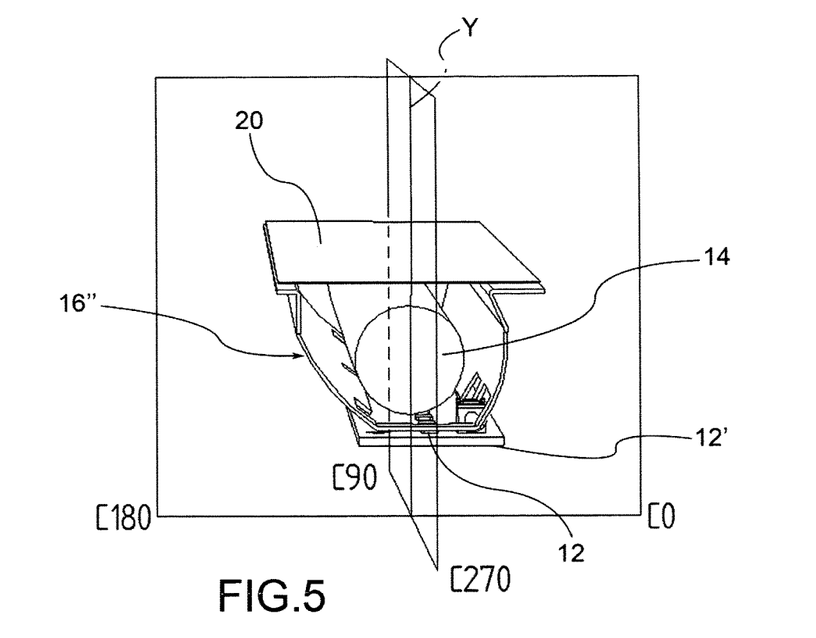
FIG. 5 is a perspective view of a lighting apparatus according to the invention, in a further embodiment.
Figure 5A:
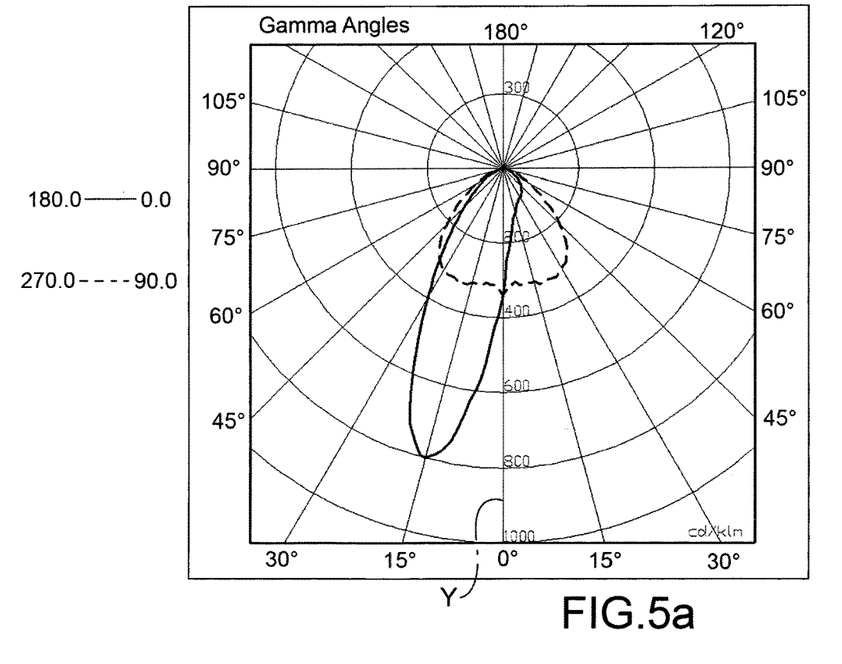
FIG. 5a is a diagram of the distribution of the light beam generated by the apparatus of FIG. 5.

The optical system described offers the possibility of further implementations. For example, by laterally moving the cylindrical lens 14 with respect to the row of lighting sources 12 (or vice versa), even by a few millimeters, one obtains an inclination effect of the blade of light with respect to the plane perpendicular to the plane on which lie the lighting sources 12, i.e., an inclination with respect to the optical axis Y of the system (FIGS. 3, 5 and 5a). Such an asymmetric beam is particularly suitable for the lighting effect of vertical planes.

For example, with a lateral offset of 3 mm of the row of light sources 12 with respect to the cylindrical lens 14 and adapting both the profile of the reflector 16", as for example in FIG. 5, and the degree of diffusion of the filter 20, one obtains wall-washer optics, whose light distribution is illustrated in the diagram of FIG. 5a.

In the embodiment examples illustrated, the lighting sources 12 are LED light sources mounted in a linear configuration on an electronic board 12' (which thus defines the plane of the lighting sources).

In certain embodiments, the LED board is a high-power monochromatic or multi-chromatic board (with RGB colour-change, RGBW or CTC function).

Figure 6:
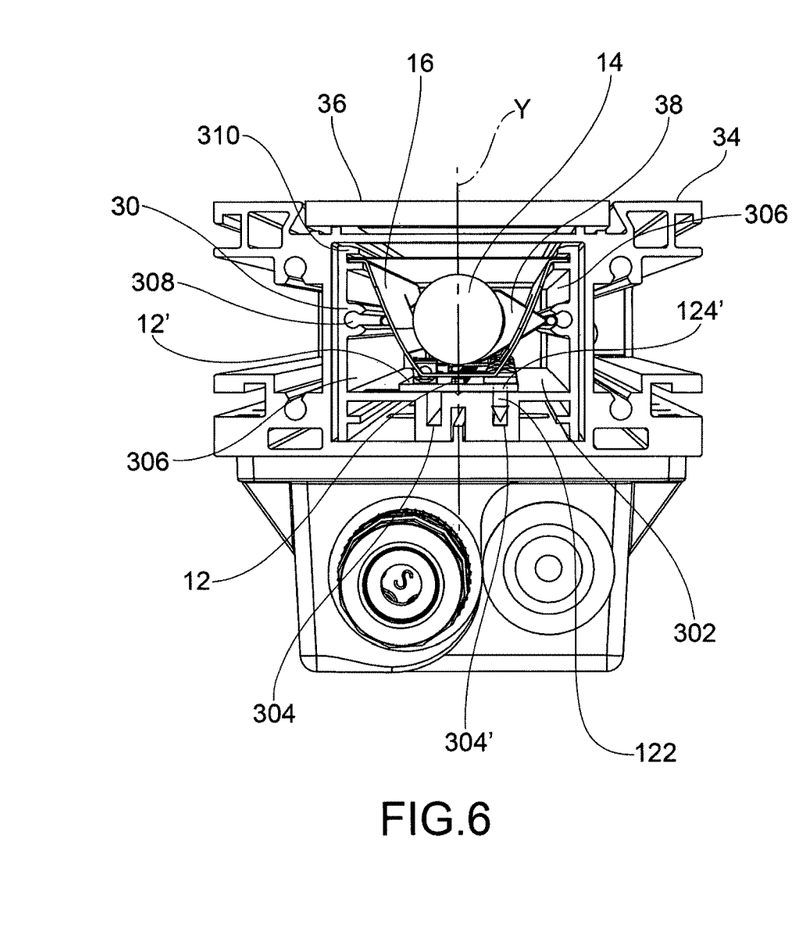
FIGS. 6 and 6a are axial sections of a lighting apparatus according to the invention in a practical embodiment, with two different forms of reflector and with the board of LEDs mounted in two positions different from each other.
Figure 6A:
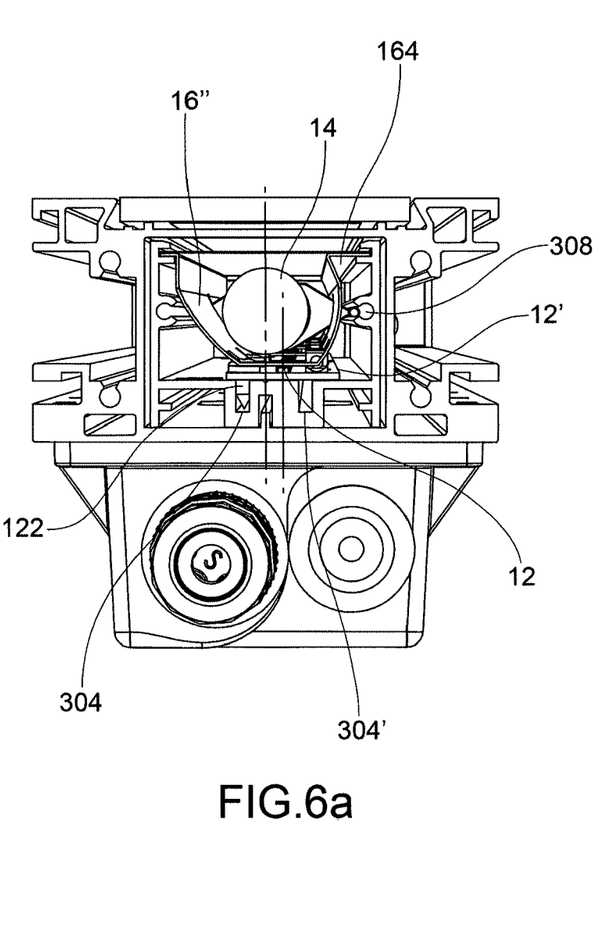
Figure 7:
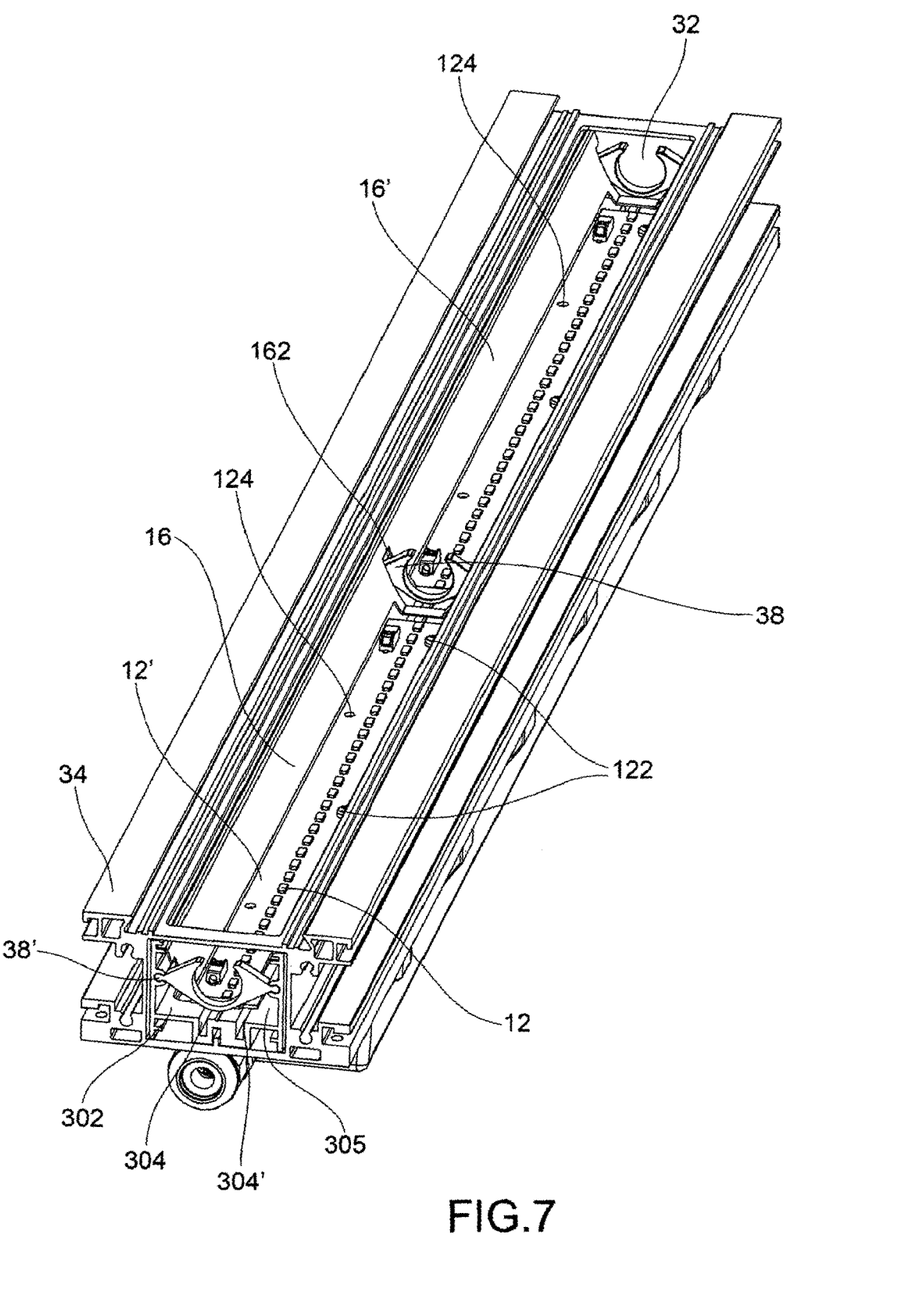
FIG. 7 is a perspective view of the lighting apparatus of FIG. 6, but without closing glass and lens.

FIGS. 6, 6a and 7 show a practical embodiment example of the lighting apparatus according to the invention.

The lighting apparatus comprises an inner profile 30, for example made of aluminium, suitable to support the optical elements of the apparatus.

The inner profile 30 is housed in a longitudinal chamber 32 of an outer profile 34, for example, also it made of aluminium, which forms the housing of the lighting apparatus and which supports a closing glass 36 placed to close the emission to window of the light flow.

The inner profile 30 forms a support surface 302 for the electronic board 12' on which a row of LEDs 12 is mounted.

Under the electronic board 12', the inner profile 30 forms at least two channels 304,304' which extend parallel to the development axis X of the lighting apparatus.

Each channel 304,304' is suitable to receive a row of fixing screws 122 that lock the electronic board 12' to the support surface 302.

In the electronic board 12' are formed at least two rows of fixing holes 124,124' for the fixing screws 122. Preferably, the row of LEDs 12 is positioned between the two rows of fixing holes 124,124'. As will be described below, only one of these rows of fixing holes 124,124', and of the corresponding channels, is engaged by the fixing screws 122 at a time.

In particular, considering as fixed reference the optical axis Y passing through the centre of the cylindrical lens 14 and that is perpendicular to the support plane 302, the channels 304,304' are positioned at a different distance from the optical axis Y. In this case, the two rows of fixing holes 124,124' are preferably equidistant from the optical axis Y.

When the row of fixing screws 122 is screwed into a channel 304', as illustrated for example in FIG. 6, the row of LEDs 12 is aligned to the optical axis Y.

When the row of fixing screws 122 is screwed into the other channel 304, as illustrated for example in FIG. 6a, the row of LEDs 12 is offset, i.e., translated laterally with respect to the optical axis Y, so as to realise, together with the reflector for asymmetric beam 16", the configuration corresponding to FIG. 5.

Therefore, the position of the row of LEDs 12 with respect to the optical axis Y, and thus with respect to the cylindrical lens 14, is determined simply by moving the electronic board 12' on the support plane 302 and using for the fixing of the board one of the two channels 304,304' and one of the two rows of holes 124,124'.

Obviously, in an embodiment variant, the channels 304, 304' may be made equidistant from the optical axis Y, differentiating instead the distance of the fixing holes 124, 124' with respect to this optical axis Y.

It is therefore possible to realise the two types of lighting apparatuses, with row of LEDs aligned to the optical axis Y and with row of LEDs offset with respect to the optical axis Y, using the same supporting structure of the lighting apparatus and the same electronic board 12'.

It is obviously possible to provide more than two channels and more rows of fixing holes to identify more than two positions of the row of LEDs with respect to the optical axis Y.

In an embodiment, the inner profile 30 forms two side walls 306 which delimit, jointly with the support surface 302, a longitudinal chamber 305 in which are housed the reflector 16,16" and the cylindrical lens 14.

In an embodiment, the side walls 306 support, longitudinally spaced between them, at least two lens-holder plates 38, for example made of a transparent plastic material.

Each lens-holder plate 38 is shaped so as to realise a shape-coupling with the cylindrical lens 14 to support such a cylindrical lens 14.

For example, in each lens-holder plate 38 is formed of a C-shaped seat, suitable to snap-couple with the cylindrical lens 14.

In an embodiment, each lens-holder plate 38 is supported only at its lateral ends 38' by the side walls 306 of the inner profile 30, so as to be suspended on the support plane 302 of the electronic board 12'.

In an embodiment, in the walls 16' of the reflector 16,16" are formed slots 162 that allow the passage of the lens-holder plates 38 through these walls 16'.

In an embodiment, in each side wall 306 is formed a longitudinal seat 308 on which is slidingly received and with shape-coupling a respective lateral end 38' of the lens-holder plate 38.

For example, each longitudinal seat 308 has a shape of a C shape open towards the longitudinal chamber 305, and the lateral ends 38' of the lens-holder plates 38 have a cylindrical shape.

In this way, in the assembly step of the apparatus, each lens-holder plate 38 can be inserted from one end of the inner profile 30 and made to slide along the longitudinal seats 308 so as to be placed in the desired position.

In an embodiment, the side walls 306 also form, in the vicinity of their top, a longitudinal shelf 310 on which rests a horizontally folded top terminal edge 164 of the reflector 16,16".

On these top edges 164 of the reflector, and thus on the longitudinal shelves 310, rests the possible holographic filter 20.

To the forms of embodiment of the lighting apparatus according to the invention, a technician in the field, to satisfy contingent requirements, may make modifications, adaptations and replacements of members with others functionally equivalent, without departing from the scope of the following claims. Each of the characteristics described as belonging to a possible embodiment can be achieved independently from the other embodiments described.

The invention claimed is:

1. Linear lighting apparatus, comprising a plurality of lighting sources aligned along a main axis of the apparatus, a cylindrical lens with its axis parallel to the main axis of the apparatus, said cylindrical lens being suitable to receive most of the light emission generated by the lighting sources and to emit a substantially collimated light beam, a reflector suitable to reflect at least a portion of the light emission not refracted by the cylindrical lens, and an inner profile that forms a support surface for the lighting sources and two side walls delimiting, together with said support surface, a longitudinal chamber in which are housed the reflector and the cylindrical lens, wherein said side walls support, longitudinally spaced between them, at least two lens-holder plates shaped to realize a shape-coupling with the cylindrical lens to support said cylindrical lens.

2. Apparatus according to claim 1, wherein the lighting sources are placed in the focus of the cylindrical lens.

3. Apparatus according to claim 1, wherein the lighting sources are placed in the focus of the reflector.

4. Apparatus according to claim 1, wherein the reflector is a parabolic reflector.

5. Apparatus according to claim 1, in which the cylindrical lens is positioned in the cavity delimited by the reflector.

6. Apparatus according to claim 1, in which the cylindrical lens is obtained from a methacrylate rod.

7. Apparatus according to claim 6, wherein said rod has a diameter of between 10 mm and 20 mm.

8. Apparatus according to claim 1, wherein the lighting sources lie on a sources plane, and wherein the axis of the device and the axis of the cylindrical lens belong to a transversal plane perpendicular to said sources plane.

9. Apparatus according to claim 1, wherein the light sources lie on a sources plane and wherein the axis of the device is external to a transversal plane on which the axis of the cylindrical lens lies and perpendicular to said sources plane.

10. Apparatus according to claim 9, in which the reflector is shaped so as to reflect the rays in the same direction as the collimated beam exiting from the cylindrical lens.

11. Apparatus according to claim 1, further comprising a holographic filter suitable to act on the collimated light beam emitted by the cylindrical lens.

12. Apparatus according to the claim 11, wherein said holographic filter is supported by the reflector.

13. Apparatus according to claim 1, wherein the light sources are LED light sources mounted in a linear configuration on an electronic board.

14. Apparatus according to claim 1, comprising an inner profile that forms a support surface on which rests an electronic board on which is mounted a row of lighting sources, and, under said electronic board, at least two channels that extend parallel to the main axis of the device and that are suitable to receive a row of fixing screws that lock the electronic board to the support surface, wherein in the electronic board are formed at least two rows of fixing holes for the fixing screws, wherein the channels or the fixing hole rows are positioned at a different distance from the optical axis passing through the centre of the cylindrical lens and that is perpendicular to the support plane of the device passing through the centre, and wherein only one channel and a respective row of fixing holes are engaged by the fixing screws, so as to identify at least two different positions of the row of lighting sources with respect to the optical axis as a function of the channel-hole pair engaged by the fixing screws.

15. Apparatus according to claim 1, wherein each lens-holder plate is supported only at its lateral ends by the side walls of the inner profile, so as to be suspended on the support plane.

16. Apparatus according to claim 1, wherein in the walls of the reflector are formed slots that allow the passage of the lens-holder plates through these walls.

17. Apparatus according to claim 1, wherein in each side wall is formed a longitudinal seat on which is slidingly received and with shape-coupling a respective lateral end of the lens-holder plate.

* * * * *

UNITED STATES PATENT AND TRADEMARK OFFICE
CERTIFICATE OF CORRECTION

PATENT NO.         : 10,145,534 B2
APPLICATION NO.    : 15/565455
DATED              : December 4, 2018
INVENTOR(S)        : Andrea Donnini

Page 1 of 1

It is certified that error appears in the above-identified patent and that said Letters Patent is hereby corrected as shown below:

On the Title Page (30) Foreign Application Priority Data should read:
-- Apr. 10, 2015 (IT) ................................ BS2015A000059 --.

Signed and Sealed this
Nineteenth Day of February, 2019

Andrei Iancu
*Director of the United States Patent and Trademark Office*